US012657568B2

(12) United States Patent
Verma

(10) Patent No.: US 12,657,568 B2
(45) Date of Patent: Jun. 16, 2026

(54) SELECT-HOLD-DRAG-DROP OPERATIONS ON SMART GLASSES LEVERAGING EYE TRACKING TECHNOLOGY AND AUGMENTED REALITY

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 163 days.

(21) Appl. No.: 18/385,498

(22) Filed: Oct. 31, 2023

(65) Prior Publication Data

US 2025/0139605 A1     May 1, 2025

(51) Int. Cl.
G06Q 20/32 (2012.01)
G06Q 20/20 (2012.01)

(52) U.S. Cl.
CPC ....... G06Q 20/3276 (2013.01); G06Q 20/208 (2013.01)

(58) Field of Classification Search
CPC .......................... G06Q 20/202; G06Q 20/3276
USPC .......................................................... 705/23
See application file for complete search history.

(56) References Cited

U.S. PATENT DOCUMENTS

| | | | | |
|---|---|---|---|---|
| 9,390,326 | B2 | 7/2016 | Publicover et al. | |
| 10,922,733 | B2 * | 2/2021 | Oh ..................... | G06Q 20/3276 |
| 11,238,526 | B1 * | 2/2022 | Le Chevalier ..... | G06Q 30/0635 |
| 11,755,102 | B2 | 9/2023 | Canberk et al. | |
| 12,056,759 | B1 * | 8/2024 | Durairaj ............. | G06Q 30/0643 |
| 12,190,183 | B1 * | 1/2025 | Verma .............. | G06K 19/06037 |
| 2013/0297460 | A1 * | 11/2013 | Spivack .................. | G06F 3/011 705/27.2 |
| 2015/0070262 | A1 * | 3/2015 | Peters ..................... | G06F 3/013 345/156 |
| 2021/0257084 | A1 | 8/2021 | Freeman et al. | |
| 2023/0171456 | A1 * | 6/2023 | Sharma .................. | G06T 11/00 725/38 |
| 2023/0288704 | A1 * | 9/2023 | Verma ..................... | G06T 11/60 |
| 2023/0324703 | A1 | 10/2023 | Adema et al. | |
| 2024/0319784 | A1 * | 9/2024 | Faaborg .................. | G06F 3/165 |

(Continued)

FOREIGN PATENT DOCUMENTS

| | | |
|---|---|---|
| CN | 111897129 | 11/2020 |
| JP | 2021525036 | 9/2021 |
| KR | 10-2020-0057223 | 5/2020 |

(Continued)

*Primary Examiner* — Hani M Kazimi
(74) *Attorney, Agent, or Firm* — Weiss & Arons LLP

(57) ABSTRACT

A QR code may be viewed with smart glasses having an eye tracker. The QR code may be selected by a user focusing on the QR code. The QR code may be captured. The captured QR code may trigger a display on the lens of an object, such as a selector, a bill payment method, or a keypad, or a web page. A user may select and hold a selector object at a first position by focusing on it. Subsequent eye movement may drag the selector object to a new position. A payment method may be selected when the selector object is dropped at the new position having a payment method object. A payment method may be alternatively selected when the user focuses directly on the payment method object. A password may be entered on a keypad or keyboard shown on the lens using eye tracking.

18 Claims, 10 Drawing Sheets

(56) References Cited

U.S. PATENT DOCUMENTS

| | | | |
|---|---|---|---|
| 2025/0078061 A1* | 3/2025 | Verma | G06Q 20/202 |
| 2025/0111076 A1* | 4/2025 | Verma | G06F 21/84 |

FOREIGN PATENT DOCUMENTS

| | | |
|---|---|---|
| WO | WO2016/203212 | 12/2016 |
| WO | WO2022/101723 | 5/2022 |
| WO | WO2022/132171 | 6/2022 |

* cited by examiner

SMART GLASSES COMPONENTS

SELECT-HOLD-DRAG-DROP OPERATIONS ON SMART GLASSES LEVERAGING EYE TRACKING TECHNOLOGY AND AUGMENTED REALITY

FIELD OF THE DISCLOSURE

Aspects of the disclosure relate to securely performing select, hold, drag and drop operation with smart glasses leveraging eye tracking and augmented reality.

BACKGROUND OF THE DISCLOSURE

A customer may pay a bill by scanning an electronic computer-readable code, such as a QR code, with a user device, such as a smartphone. This may allow for a contactless transaction. The QR code may include details needed for payment. The QR code may be displayed at a point of sale (POS). The customer may authorize the payment by entering information, such as selecting a payment method, like a card number, and a password, by hand on an input of the user device, such as by using a keypad or a touch screen on the user device or with a hand gesture. However, using hand movements presents security concerns as these movements may be visible to other people at the POS, who may attempt to mimic the hand movements to gain access to a payment application.

It would be desirable for a user to be able to pay a bill electronically at a POS hands-free so that user actions that are not visible to others.

SUMMARY OF THE DISCLOSURE

It is an object of this invention to provide systems, computer program products, and methods for leveraging eye tracking technology on smart glasses to provide select, hold, drag and drop functionality in augmented reality.

Smart glasses may be provided in accordance with the present disclosure. The smart glasses may be used for electronically paying a bill at a point of sale (POS) using an electronic payment system. The smart glasses may include a lens configured to cause a display thereon one or more objects to be viewed by a user of the smart glasses in augmented reality. One or more of the one or more objects may represent multiple payment methods including the payment method which the user selects. The smart glasses may include an eye tracker to track movements of an eye of the user. The smart glasses may include one or more processors operable to execute a payment application that is configured to detect, using the eye tracker, a focus of the eye on a first object of the one or more objects shown on the lens at a first position, determine a user selection of the first object when the focus of the eye on the first position is maintained by the user for a predetermined duration, and, in response to the determination of a user selection of the first object, electronically execute payment of the bill using the first object.

The smart glasses may include a camera configured to capture an image of a QR code that the user views through the lens at the POS. The QR code may be a payment QR code. The payment application may be configured to cause a display of the one or more objects on the lens when the user has focused the eye on the QR code for a second predetermined duration. The QR code may include payment details for the bill.

The first object may be used to select a payment method for paying the bill. The first object may be displayed at the first position on the lens. The payment application may be configured to hold the first object that has been selected and monitor movement of the eye of the user using the eye tracker to enable the user to drag the first object from the first position to a second position on the lens by the movement of the eye. The payment application may be configured to release the first object at the second position when the user focuses on the first object at the second position for a third predetermined duration. The release may release (drop) the first object at the second position such that the first object is no longer selected and subject to being dragged further by the user's eye movement. A second object of the one or more objects may be displayed at the second position and may represent the payment method.

The first object may be configured as a selector object to select the second object when the first object is moved to the second position. The payment application may be configured to cause the electronic execution of the bill payment using the payment method represented by the second object when the user releases the first object at the second position.

The payment application may be configured to release the selected first object when the user focuses on a second position on the lens at which no object is displayed or at a location designated for releasing for a fourth predetermined duration.

The payment application may be configured to cause a display on the lens, in response to selection of the payment method, a keypad or keyboard for the user to enter a password having one or more characters using the eye tracker by focusing on each of the one or more characters in the password one at a time for a fifth predetermined duration to enter the password.

A computer program product for using smart glasses to electronically pay a bill at a point of sale (POS) may be provided in accordance with the present disclosure. The computer program product may include a payment application that includes executable instructions that, when executed by a processor on a computer system, display, on a lens of the smart glasses, one or more objects to be viewed by a user of the smart glasses in augmented reality, detect, using an eye tracker, a focus of the eye on a first object of the one or more objects shown on the lens at a first position, determine a selection by the user of the first object when the focus of the eye is maintained at the first position by the user for a predetermined duration, and in response to the determination of a user selection of the first object, electronically execute payment of the bill using the first object. One or more of the one or more objects may represent multiple payment methods including the payment method which the user selects.

The executable instructions may include, before displaying the one or more objects on the lens, capturing an image of a QR code that the user views through the lens. The display of the one or more objects may be triggered when the user has focused the eye on the QR code for a second predetermined duration. The QR code may include payment details for the bill.

The selection of the first object may select a payment method for paying the bill. The first object may include an image, shown at the first position on the lens. The payment application may be configured to hold the first object that has been selected and monitor movement of the eye of the user using the eye tracker to enable the user to drag the first object from the first position to a second position on the lens by the movement of the eye. The executable instructions may place the first object at the second position when the user focuses on the first object at the second position for a third predetermined duration. A second object of the one or more objects may be located at the second position and may represent the payment method. The first object may be configured as a selector object to select the second object when the first object is moved to the second position. The payment application may be configured to cause the electronic execution of the bill payment using the payment method represented by the second object when the user releases the first object at the second position.

The executable instructions may release the selected first object when the user focuses on a second position on the lens at which no object is displayed for a fourth predetermined duration. The executable instructions may display on the lens, in response to selection of the payment method, a keypad or keyboard for the user to enter a password having one or more characters using the eye tracker by focusing on each of the one or more characters in the password one at a time for a fifth predetermined duration to enter the password.

Smart glasses for selecting an object viewed with the smart glasses, the smart glasses may be provided in accordance with the present disclosure. The smart glasses may include a lens configured for a user to view the object through the lens. The smart glasses may include a camera configured to scan an image of the object. The smart glasses may include an eye tracker to track movements of an eye of the user. The smart glasses may include one or more processors operable for hands-free selection of the object by detecting, using the eye tracker, a focus of the eye on the object, determining a user selection of the object for scanning when the focus of the eye is maintained by the user on the object for a predetermined duration, and performing an operation represented by the selected object. The object may include a QR code. The operation may include an electronic bill payment. The operation may include a navigation operation to automatically navigate to a web page specified by QR code.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
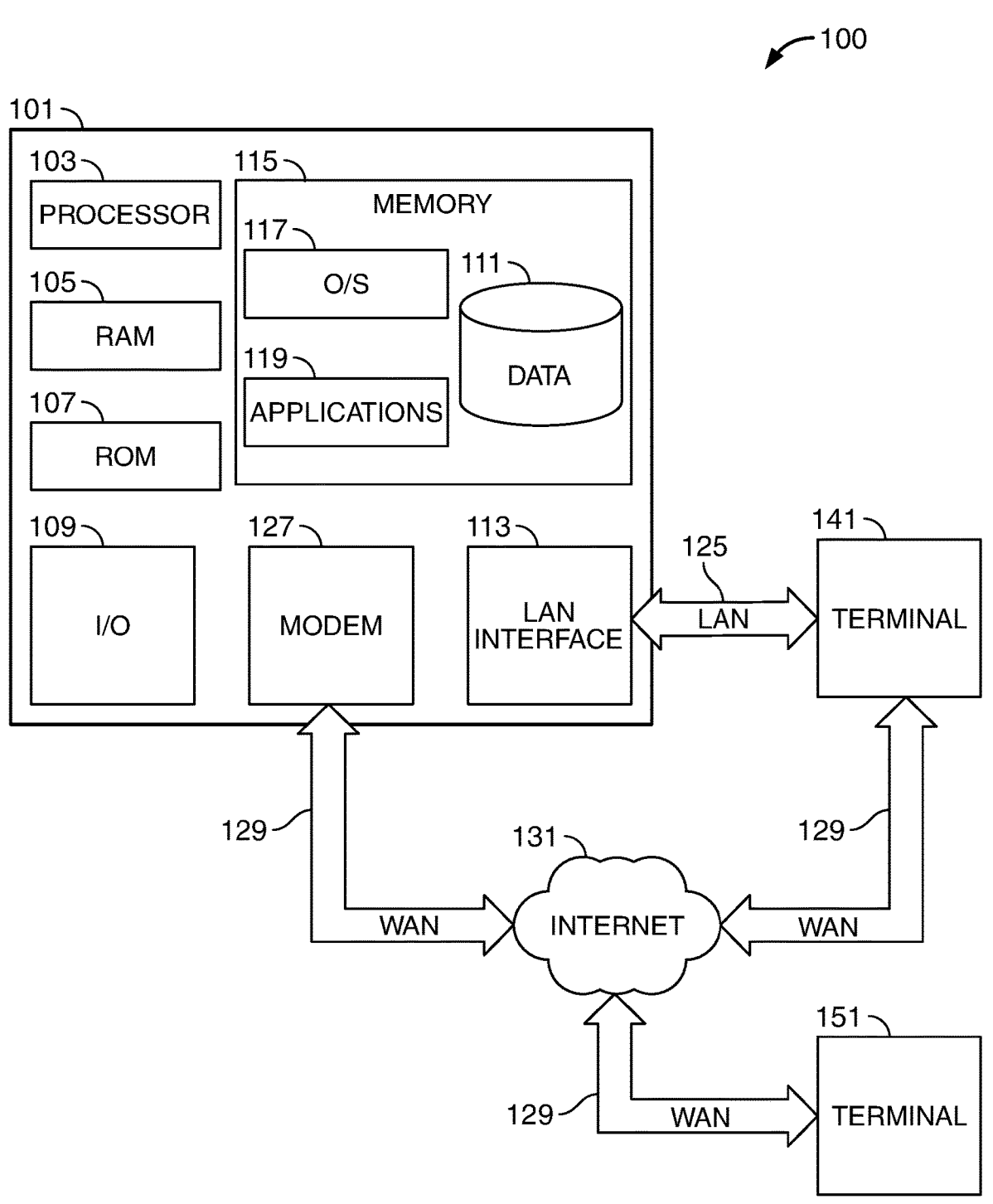
FIG. 1 shows an illustrative system architecture in accordance with principles of the disclosure.

The present disclosure relates to systems, computer program products, methods, and apparatus that may leverage eye tracking technology on smart glasses to enable a user to select, hold, drag, or drop an object within an augmented reality environment of the smart glasses. The eye tracking may track a user's eye movements (such as eyeball movements) to determine a position on the smart glasses that the user is viewing (e.g., gazing) and the duration of the user's focus on a particular position. The eye tracking may also enable a user to enter a user password using the smart glasses. The eye tracking technology may be any type of eye tracking technology. The eye tracking may be used to monitor movement of a single eye of the user, such as the right eye or the left eye. In embodiments, the eye tracking may monitor movement of both eyes.

The eye tracking may scan a QR code that may be displayed, for example, at a point of sale. The QR code may be, for example, a merchant static QR code, which is an uneditable QR code. The QR code may be displayed, for example, on a merchant device, on a user device to which it may be transmitted, or may be printed. The QR code may represent payment QR code that includes a bill payment request. The QR code may include payment details needed for payment, such as, for example, merchant information, amount of transaction, payee information, accepted forms of payment, such as types of credit cards accepted by the merchant, and information regarding items or services purchased, like product descriptions or identifiers, product prices, or taxes. Where the QR code is for a payment request, the eye tracking may be used to perform the steps needed to authorize and complete payment. This may allow hands-free payments to be made using smart glasses. The QR code may be a navigation QR code that specifies a web page to which a web browser should navigate.

Hands-free select, hold, or drag and drop functionality using eye tracking may be more secure than if hand or finger gestures were used in conjunction with the smart glasses to perform the select, hold, and drag and drop functions because hand or finger gestures may be mimicked by someone observing the user whereas selection, holding, dragging and dropping using eye tracking may not be visible to others.

As a first example of an implementation of the present disclosure, a user wearing smart glasses that includes a payment application, may select a QR code, such as a payment QR code, to be captured for decoding by maintaining a focus on the QR code with the user's eye for a predetermined duration (e.g., one, two or five seconds). The user may be a customer of the POS. The predetermined duration may be a threshold time for the user to make a selection. The smart glasses may then capture the QR code and display the QR code on a lens of the smart glasses. Once displayed on the smart glasses, the displayed QR code may be held as a selected object for further movement by eye tracking to a new position on the smart glasses.

In embodiments, rather than just displaying the captured QR code on the lens, a selector object may be generated for display at a first position on a lens of the smart glasses. The selector object may take different forms. The selector object may include an image of the QR code. The selector object may be used to select another object displayed on lens. A user may focus on the selector object for a predetermined duration and may thereby select the selector object. After being selected, selector object may be held by the eye tracking application so that eye movement of the selector object drags the selector object to a new position on the lens.

After capture of the QR code, the QR code may be decoded and the type of the QR code may be determined. If a scanned QR code includes payment instructions, then the smart glasses may show the user available payment methods, for example, the user's store account, one or more credit cards, or a debit card, by displaying objects representing payment methods on the lens of the smart glasses. The payment methods may have been previously stored with the user profile for the user on a server in communication with the smart glasses.

The position of the QR code or the selector object as displayed on the lens of the smart glasses may be changed by the user while the user maintains the hold state. For example, the QR code or selector object may be "dragged" (moved) from one position on the smart glasses and "dropped" (released from further movement) at another position on the smart glasses to select the payment method, e.g., one of the displayed credit cards. The movement of the QR code or selector object may be initiated by tracking the eye movement of the user inside the smart glasses to a new position, where the QR code may be released. The release of the QR code at the new position may be performed by having the user maintain the focus of the user's eye at the new position for a predetermined duration. Before releasing the QR code at the new position to complete the selection of the payment method, the smart glasses may ask for a user confirmation.

If the QR code is a payment QR code, after the QR code or selector object is released (dropped) at the second position by the user focusing on the second position for a predetermined duration, the electronic payment application may determine that the payment method represented by a payment method object at the second position is to be used for payment at the POS.

After a payment method is selected, the smart glasses may optionally be set to require entry of a password. The password may be, for example, a personal identification number (PIN) or a biometric. To enter a PIN, an image of a numeric keypad may be displayed on the smart glasses. The keypad may be used by the user, using eye movements, to enter the password, such as a personal identification number (PIN) number, to authenticate the payment. The position at which the keypad is displayed on the smart glasses may be randomly shuffled at different times that the keypad is displayed to enhance security so that user eye movements may not be duplicated by another person to enter the same password.

The user may focus the eye on one digit at a time on the keypad. If the focus time on one digit is held for the predetermined duration which may be a "select" threshold time, such as one, two, or five seconds, then that digit is selected to be entered as part of the PIN. The user may go backwards to change a response by focusing on a go-back key.

The user may focus an eye on a particular position, such as on a displayed finish/enter button (not shown), for a predetermined time to confirm the payment.

In another embodiment, the QR code may be a navigation QR code that is encoded to direct a user to a web page when the QR code is scanned. A user may focus on a QR code using an eye tracker for predetermined duration to select the QR code. The QR code in this implementation may specify a web page. The user may be directed to view a web page indicated by the QR code. The user may enter further selections at the web page and engage in dragging and dropping using eye tracking. The focus of the eye may be maintained on an object for a predetermined duration that meets or exceeds a threshold length of time to make the selection, hold, drag or drop.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
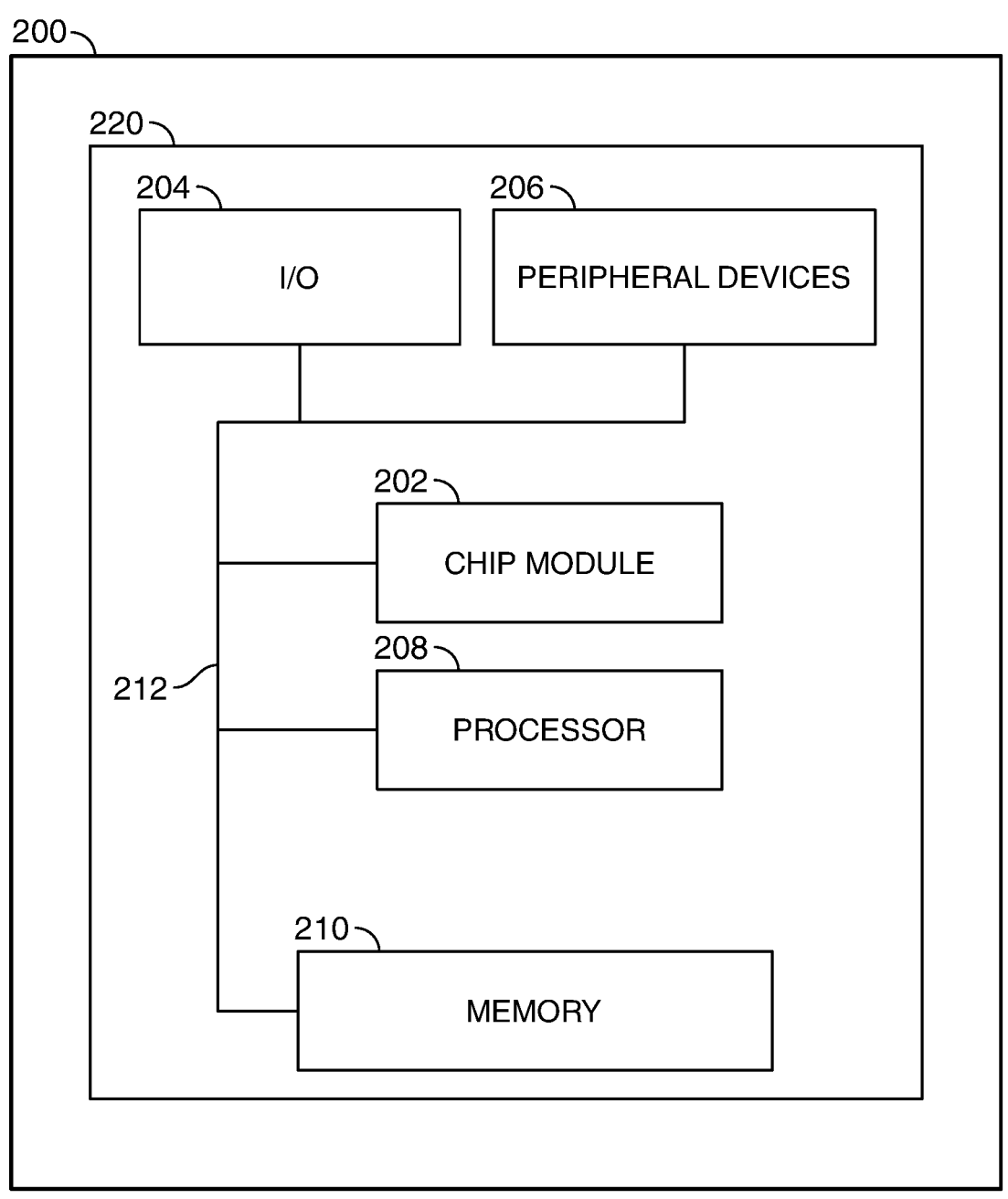
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
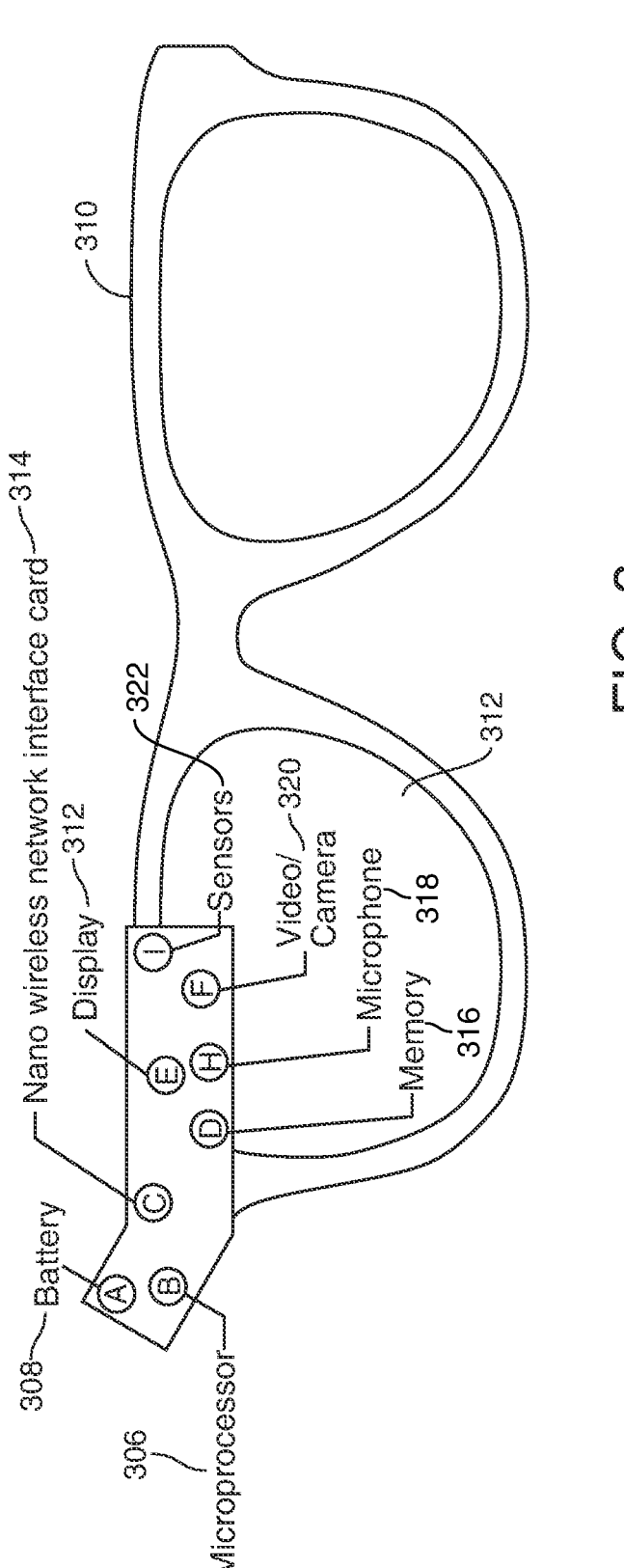
FIG. 3 shows illustrative smart glasses in accordance with principles of the disclosure.

FIG. 3 shows illustrative smart glasses 310 in accordance with principles of the invention. Illustrative smart glasses 310 may include a frame supporting one or more lenses 312 (e.g., left or right lenses), and a plurality of hardware embedded in smart glasses 310 or connected to smart glasses 310. The plurality of hardware may include one, two, some, or all of hardware A-I illustrated in FIG. 3.

The plurality of hardware may include a power supply, such as battery 308 shown at A, a processor such as a microprocessor 306 shown at B, a wireless network interface card ("NIC") 314 shown at C (such as a nano wireless NIC, or an interface that has light fidelity ("LiFi") capability or near field communications (NFC) capabilities), display on a lens 312 shown at E, sensors 322 shown at I, video/camera 320 shown at F, microphone 318 shown at H, and a non-transitory memory 316 shown at D. The functionalities of each of the aforementioned hardware elements is described in greater detail herein.

Smart glasses may further include a user interface UI, an encryption and authentication circuit, and a transceiver system with components including a transceiver to enable wireless services, such as 5G cellular service.

Battery 308 may power the other components of smart glasses 310, such as the display and the microprocessor. Microprocessor 306 may execute processing within smart glasses 310, such as the various controllers and applications described herein. Nano wireless NIC 314 may establish communication with a nearby wireless network. The wireless network may be used to communicate with backend computers, servers, other computers, or other smart glasses. Lens 312 may display software-based displays to the user, such as augmented reality displays. Sensors 322 may monitor various sensor inputs to smart glasses 302, including a sensor to track a user eye movements.

Video/camera 320 may be operable to record a video or transmit a video or one or more still images. The video may record or capture the view of smart glasses 310, such as a view of a QR code, including any livestream of information available in the view of the smart glasses 310. The smart glasses may include multiple cameras per eye for increased accuracy in measuring eye movement direction. Smart glasses may include one or more sensors to provide differentiation between eye movements. Smart glasses may include compensation, calibration, and recalibration capabilities. In some embodiments, the cameras may be combined with illuminators. The illuminators may include a near infrared light source or any suitable light source. The video may be stored in memory 316. The video may be streamed to other nodes on the network and not stored in memory 316. The video may include multiple frames.

The smart glasses may include an eye tracking device. The eye tracking device may connect to or may be incorporated into the smart glasses. Alternatively, the eye tracking device may be located separate from the smart glasses. The camera on smart glasses may capture data from a user's eye movement. The smart glasses may further include a memory unit for storing data captured from the camera. The smart glasses may also include a sensor configured to capture the user's eye movements. Sensors may include the camera, radio sensors, infrared sensor, or a light sensor. These electronic sensors may be configured to measure changes in light reflected off a user's eye. The smart glasses may be configured to use these measurements and translate them into control instructions. The smart glasses may further include an antenna configured to enable radio frequency communication. The smart glasses may include a processor operable to capture, store and transmit data.

One or more software modules may execute on the processors. The one or more software modules may be stored in a memory located within the smart glasses. The one or more software modules may, in the alternative, be referred to as applications. The applications may enable the smart glasses to execute various tasks.

The processor may execute an eye (e.g., eyeball) tracking application. Sensors may be controlled by the eye tracking application executed on the smart glasses' processor. Eye position data detected by the sensors may be collected by the eye tracking application. Eye position data detected by the sensors may be stored in a memory embedded in the smart glasses. Sensors for tracking user eye position may include cameras.

One method of tracking user eye position may involve eye movement vectoring. Eye movement vectoring is a method for remote, non-intrusive eyeball tracking. A light source illuminates the eye causing visible reflections and a camera captures an image of the reflections. A vector is calculated based on the angles between the eye reflections. The direction of the vector combined with other geometrical features of the reflections may be used to determine eye position. Eye position may include eye movement direction.

The measurement of eye movement data may be performed using deep neural machine learning or other algorithms. One or more of these steps may be performed locally at the smart glasses or the data may be transferred to a remote or external server with additional computing power.

The external computing device may include a smart glasses interface. The smart glasses interface may receive eye position data from the smart glasses. The smart glasses interface may determine the relevance of the eye position data. The determination may be based on a level of eye movement. Eye position data may be associated with eye movement based on any suitable metric.

Metrics for tracking eye position may include a determination of eye movement points. One eye movement point may equal one raw sample captured by the eye tracker application. Fixation may occur when an eye movement point is maintained at a location for a specific amount of time. Fixation may be associated with eye movement. Fixation may be associated with a threshold level of eye movement.

Software applications executed by the smart glasses and the remote server may be stored within the non-transitory memory and/or other storage medium. Software applications may provide instructions to the processor that enable the apparatus to perform various functions. The instructions may include any of the smart glasses methods and processes described herein. For example, the non-transitory memory may store software applications such as an eye tracking module and data capture module. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Figure 4:
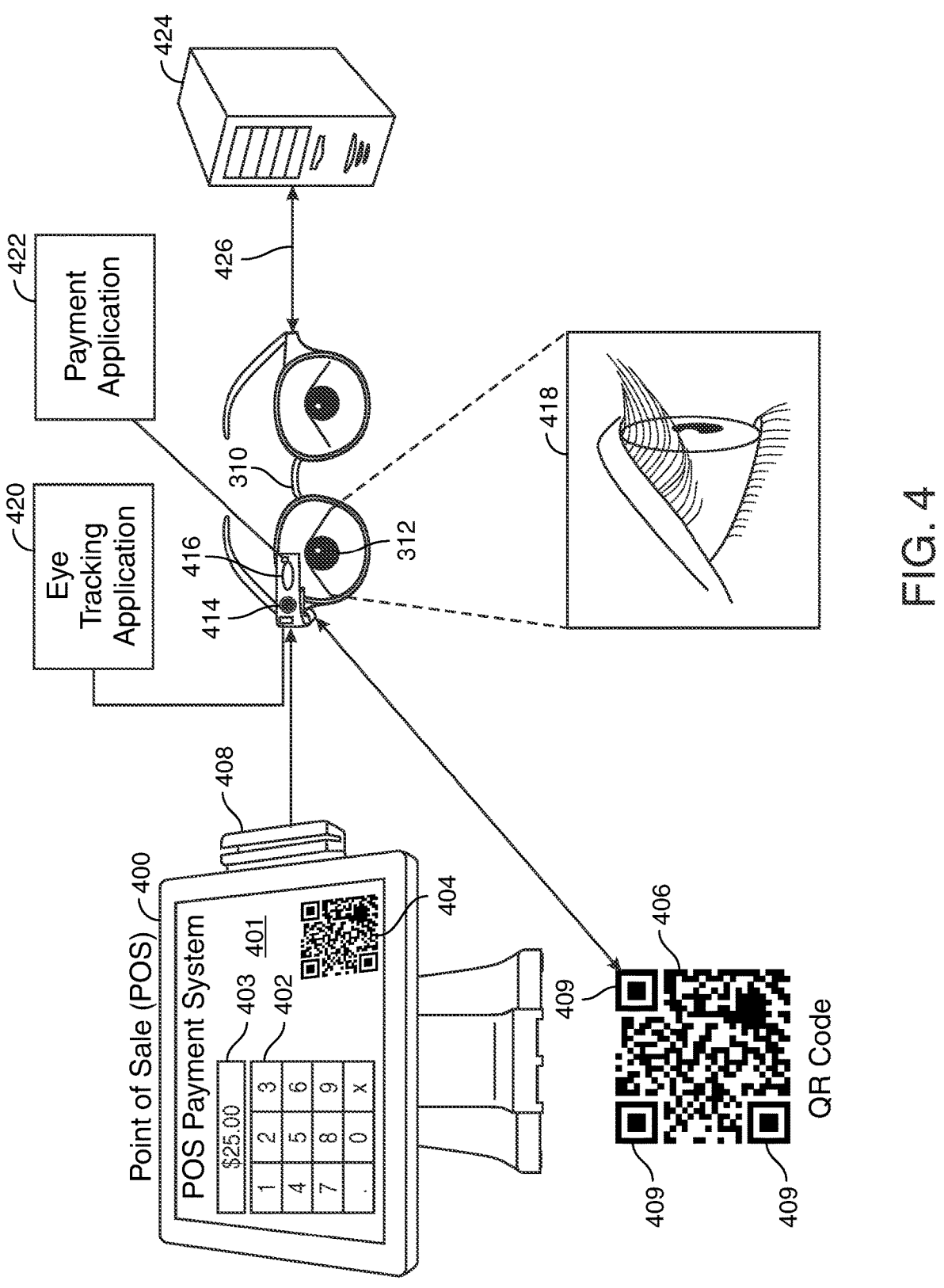
FIG. 4 shows an illustrative example of a system that uses eye tracking on smart glasses for bill payment in accordance with principles of the disclosure.

FIG. 4 shows an illustrative system with which the eye tracking application of the present disclosure may be used. In the illustrated system, a user wish to make an electronic payment at a merchant using a hands-free electronic POS payment system 400. POS payment system 400 may include a display 401 on which a QR code 404 may be displayed. POS payment system 400 may also be used by the POS to enter transaction information, such as on a displayed keypad 402 or keyboard, and may display transaction information, such as a transaction amount 403, on display 401. QR code 404 may be generated by a QR code generator (not shown) that is stored on POS payment system 400 or on another electronic device that is in communication with POS payment system 400. QR code 404 may include payment details for a user to effectuate a payment of a bill for a transaction in accordance with the steps described below. Payment details may include, for example, merchant information, amount of transaction, payee information, accepted forms of payment, such as types of credit cards accepted by the merchant, and information regarding items or services purchased, like product descriptions or identifiers, product prices, or taxes. QR code may also include an alignment pattern 409, which may include indicia at multiple locations of the QR code, for reading the QR code with the correct alignment.

POS payment system 400 may be connected to a printer (not shown), in a wired or wireless connection, to print a copy of the QR code 404 for the user. POS payment system 400 may also include other conventional payment features, such as a card reader 408 for users to swipe credit card or debit card rather than scanning a QR code for payment.

To effectuate the hands-free electronic payment, the user may use smart glasses 310. Smart glasses 310 may have a frame and one or more lenses 312 in the frame. Smart glasses 310 may include other components, as mentioned above such as a camera 414 and one or more sensors, including an eye tracking sensor 416, for tracking an eye movement of the user. One lens of smart glasses 310 may be used for eye tracking or both right and left lenses of smart glasses 310 may be used for eye tracking. Smart glasses 310 may be worn with the lens 312 positioned in front of the user's eye. Camera 414 and eye tracking sensor 416 may be integrated into the smart glasses 310 or may be an attachment to smart glasses 310. Camera 414 may be used to capture objects viewed by smart glasses 310. Eye tracking sensor 416 may be positioned on smart glasses 310 such that eye tracking sensor 416 may track the movement of an eye 418 of the user for eye tracking purposes. Smart glasses 310 may include a QR code reader in a camera application on smart glasses 310 or may use a separate QR code reader on smart glasses 310.

Smart glasses 310 may be activated and an eye tracking sensor 416 may be triggered to begin an eye tracking operation upon a user launching an electronic payment application, an eye tracking application 420, or a QR code reader that operates in conjunction with smart glasses 310, may be triggered by the user placing the smart glasses 310 on the user's face, may be triggered upon detection of a QR code by camera 320, or may be otherwise triggered. An "eye tracker" may include eye tracking sensor 416 and may include eye tracking application 420. Smart glasses 310 may communicate, wired or wirelessly with a computer or server 424 over link 426 to obtain information for decoding the scanned QR code and for executing payments to the POS.

Eye tracking information gathered using smart glasses 310 may be processed and stored on smart glasses 310 and may be transmitted for storage on computer/server 424.

Figure 5B:
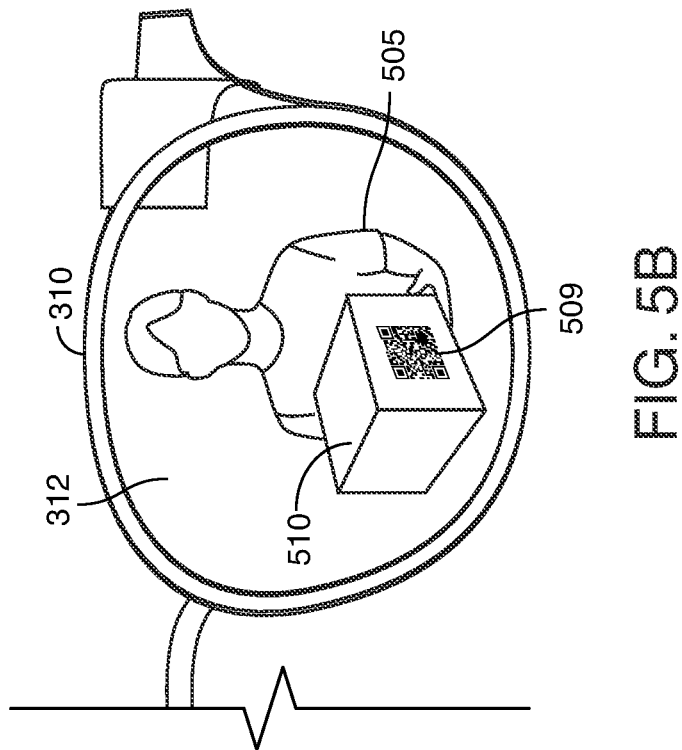
FIG. 5B shows an illustrative example of an object representing the scanned QR code displayed on the smart glasses in accordance with principles of the disclosure.
Figure 5A:
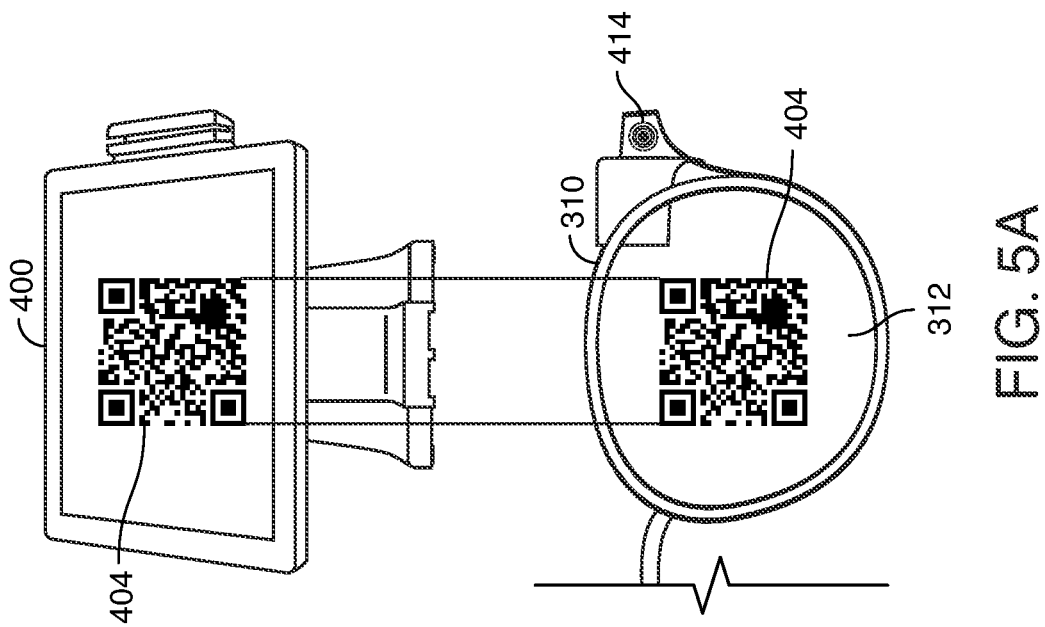
FIG. 5A shows an illustrative example of a QR code as viewed with smart glasses in accordance with principles of the disclosure.

FIG. 5A shows an illustrative example of how QR code 404 may be displayed on POS payment system 400, such as in a web browser, or on a printout 406 of the QR code and how the displayed QR code may be viewed by a user through lens 312.

QR code 404 may be viewed by a user on lens 312 of smart glasses 310 on the side of the lens facing the user's eyes. The user may focus on the QR code 404 with smart glasses 310. The duration (length) of time that the user focuses the user's eye on the QR code may be tracked by the eye tracking application 420. Upon focusing on the QR code 404 for a predetermined duration, QR code 404 may be selected and captured in a memory at smart glasses. The predetermined duration of time, such as for 1, 2, or 5 seconds or for some other length of time. The predetermined duration may be set on smart glasses 310 in hardware or software and may be adjustable by the user to accommodate user preferences. Eye tracking application 420 may determine the type of information in QR code 404. For example, eye tracking application 420 may determine whether QR code 404 represents payment information or link information. A copy of the QR code 404 may be displayed, for a time as is on a display inside lens 312.

FIG. 5B shows an illustrative example in which, upon reading the QR code, payment application 422 may display the captured QR code at 509 on lens 312. The QR code may be displayed within a graphic 505. Graphic 505 may be a general use graphic for use by payment application 422 or may be customized or selected from a group of available graphics by a user. Graphic 505 may be considered as a displayable object on the lens or graphic 505 may be enclosed within a displayable object on the screen, such as within a box in an area of the display or within another-shaped object. In the illustrated graphic 505, the QR code is shown on the side of a box that is carried by a person. Displaying QR code 509 as a graphic may assist a user in distinguishing between the QR code when it is being viewed and the QR code after it has been captured and is being displayed on a display inside lens 312 rather than being viewed through lens 312.

After a payment QR code is captured, when the QR code is a payment QR code, graphic 505 may be displayed on lens 312 of smart glasses 310 or a different type of selection button may be displayed on the lens 312 alongside an array of displayable objects.

Figure 6:
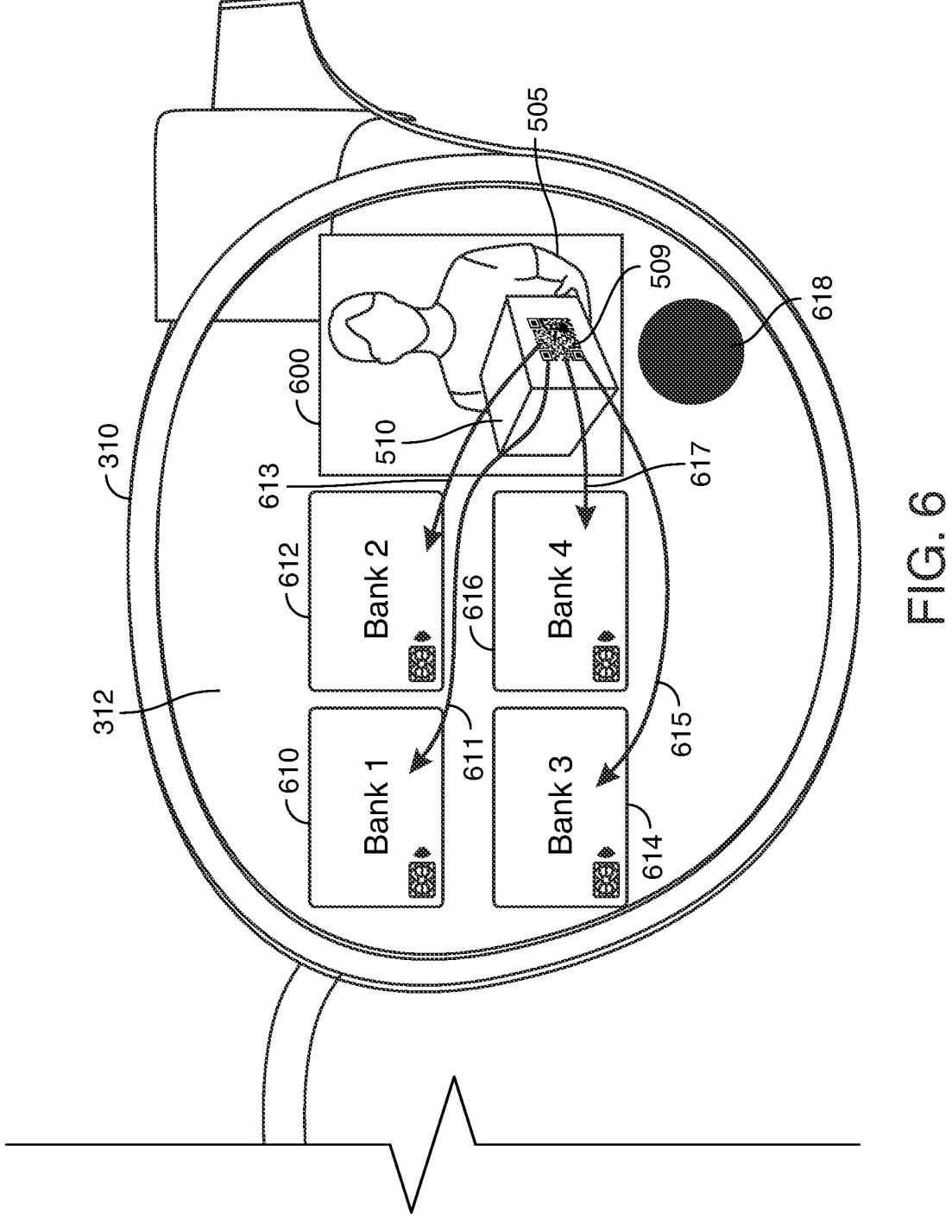
FIG. 6 shows an illustrative example of objects that may be selected and held using eye tracking in accordance with principles of the disclosure.

FIG. 6 shows an illustrative example of objects that may be simultaneously displayed on the inside of lens 312 to enable payment method selection. Objects may include a selector object 600, which may include graphic 505 having an image of the QR code, and other displayable objects 610, 612, 614 and 616 available to the user that may represent one or more payment methods. As used herein, a selector object is an object that may be dragged from a first position to a second position where another object is located to select the select the other object at the second position. These payment methods may have been established previously for this user and associated with either the user login account for an electronic payment application, by a QR code scanning application or some other application that is included on the smart glasses, or may be provided by an application on another device or computer that is in communication with smart glasses 310. Each payment method may represent a different bank card. These cards may be preregistered as associated for use with smart glasses 310. For example, four different payment methods may be available, such as a payment method associated with four different credit or debit cards issued by four different banks, Bank 1, Bank 2, Bank 3, or Bank 4. Other payment methods, such as third party payment services, may be provided. More or fewer payment methods may be shown on lens 312.

Figure 7:
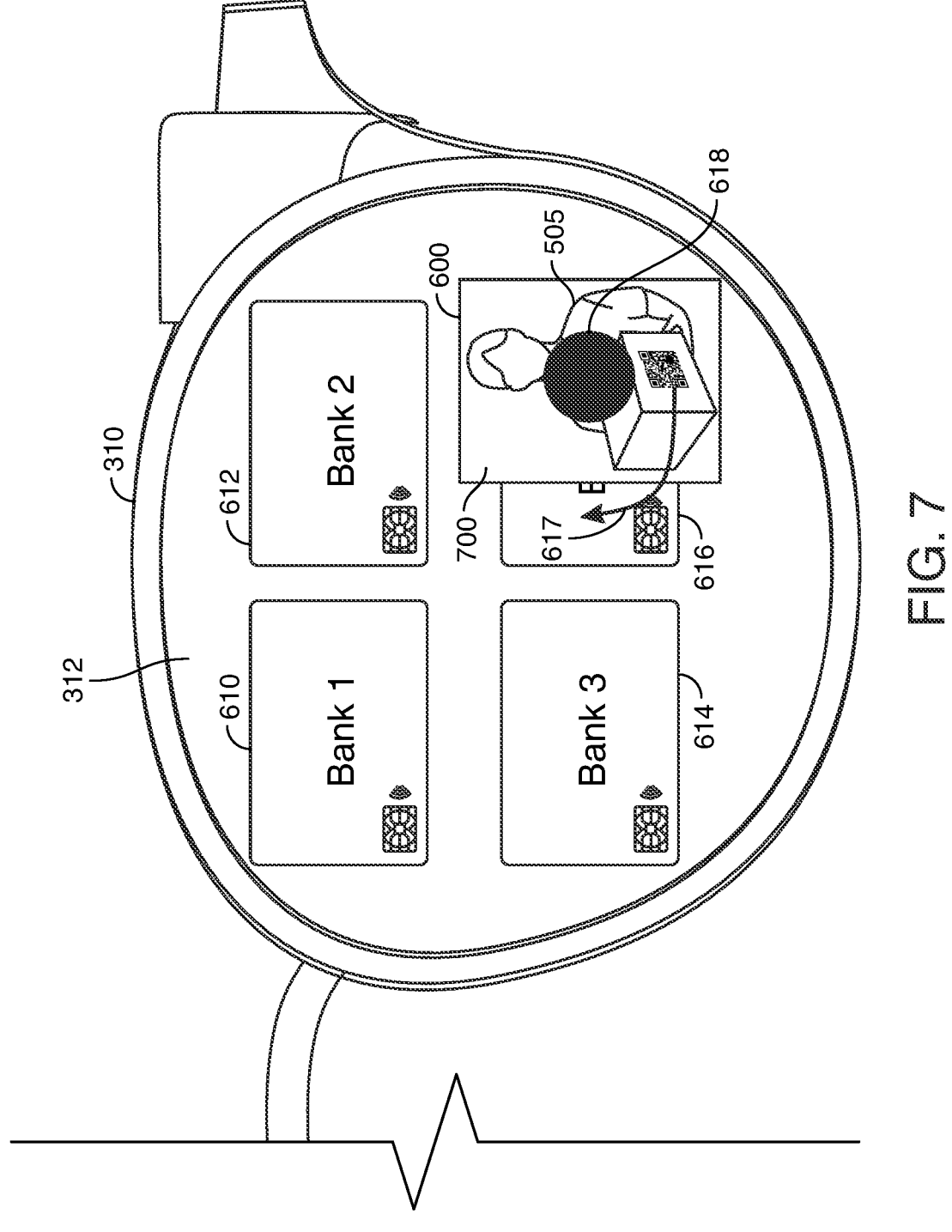
FIG. 7 shows an illustrative example of a drag and drop operation performed using eye tracking in accordance with principles of the disclosure.

The user may choose one of the payment methods in FIG. 6 by selecting the desired payment method using eye tracking. In one embodiment, the desired payment method may be selected using a drag operation. The user may focus on selector object 600 for a predetermined duration to select selector object 600. The predetermined duration in this instance may be set to be the same as the predetermined duration used for capturing the QR code or may be a different duration that is shorter or longer. The selection of selector object 600 may "hold" object for further movement of selector object 600 on the display of lens 312. While holding selector object 600, the user may drag selector object 600 by movement of the user's eye to move object 600 across the display from a first position where it is located in FIG. 6 to a new position on lens 312, such as is illustrated in FIG. 7. To select a desired payment method, the selector object 600 may be dragged, for example, along a path 611 to a position where selector object will overlap with object 610, the selector object 600 may be dragged along a path 613 to overlap with object 612, selector object 600 may be dragged along a path 615 to overlap with object 614, or selector object 600 may be dragged along a path 617 to overlap with object 616. The new position to which selector object 600 may be moved to select a payment method may be located within the boundaries of one the objects, such as toward a center of objects 610, 612, 614, or 616, so that only one payment method at a time may be selected. The drag operation may cause an object representing a payment method to be highlighted using eye tracking. A circle 618 or other type of indicia may be displayed on lens 312 to show the user the location where the eye tracker detects that the user is looking. Circle 618 may appear on top of object 600 and may remain on top of and move with object 600 while object 600 is moved to a new position.

FIG. 7 shows an illustrative move by a user of selector object 600 to a new position where selector object 600 overlaps object 616. In embodiments, the user selection of selector object 600 may be indicated with indicia 710. The user may select the desired payment method, such as represented by object 616, by dropping selector object 600 at the new position. The dropping of selector object 600 may cause selector object 600 to be placed at the new position. and released from being tracked by eye tracking. The dropping may be achieved when the user focuses on the new position for a predetermined duration. The predetermined duration in this instance may be set to be the same as the predetermined duration used for capturing the QR code or for selecting selector object 600 or may be shorter or longer. Thus, a drop operation may be performed using eye tracking. The drop operation may follow the drag operation.

The application may also or alternatively enable a user to select a payment method that may be represented by displayable objects such as objects 610, 612, 614, 616 by having a user focus with the user's eye on a particular payment method and tracking the duration of the focus. When the focus on a particular payment method extends for a predetermined duration, a desired method of payment, such as one of payment methods represented by objects 610, 612, 614, or 616, may be selected. The predetermined duration in this instance may be set to be the same as the predetermined duration used for capturing the QR code or may be shorter or longer.

To cancel a selection of an object, the user may focus on a portion of lens 312 at which no object is displayed, such as at the position of circle 618 illustrated in FIG. 6 or the user may focus on a "cancel" button (not shown) that may also be shown on lens 312 for a predetermined duration to cancel the payment options screen shown in FIG. 6. A hands-free selection operation of the payment method may thus be performed using eye tracking.

Figure 8:
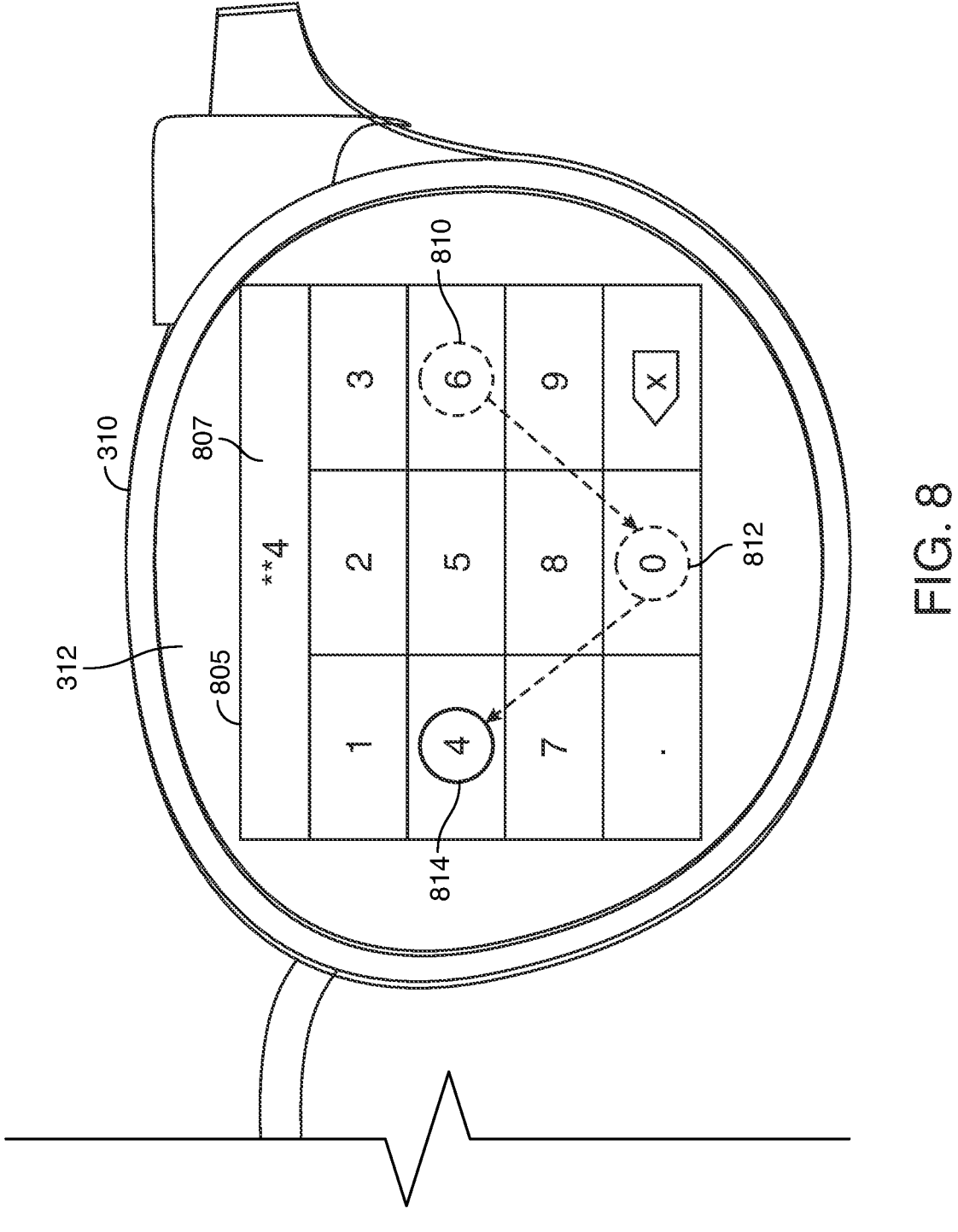
FIG. 8 shows an illustrative example of an image for entering a passcode using eye tracking in accordance with principles of the disclosure.

For security purposes, before payment of the bill by the selected payment method, a user may be required to enter a password. This password may be specific to the payment method selected. FIG. 8 shows a sample numeric keypad 805 that may pop up for display on lens 312 for entry of the password. Keypad 805 may include displayable keys that may allow entry of a PIN using eye focusing on each of consecutive numbers in the PIN. The focusing on each of the numbers may be for a predetermined duration. A fuller visual keyboard may be displayed to allow entry of numbers, alphanumeric characters, and special characters. In the illustrative example of FIG. 8, 10 digits (0 . . . 10) are shown as well as a "." and a backspace button. Selection of the numbers or characters on the keypad may be entered by selection using eye tracking. To select a number, character, or other selection, such as a backspace, the user may focus with the user's eye on the desired number, character, or other selection for a predetermined duration. After passage of the predetermined duration, numbers or characters that were selected may be displayed on a password display 807 may display characters representing keys entered on keypad 805. Characters that were entered may be represented on display 807 using asterisks or some other placeholder for added security. Following entry of the password, a payment of the bill represented by the QR code may proceed. A keyboard may be displayed on lens 312 in addition to or in lieu of keypad 805.

Figure 9:
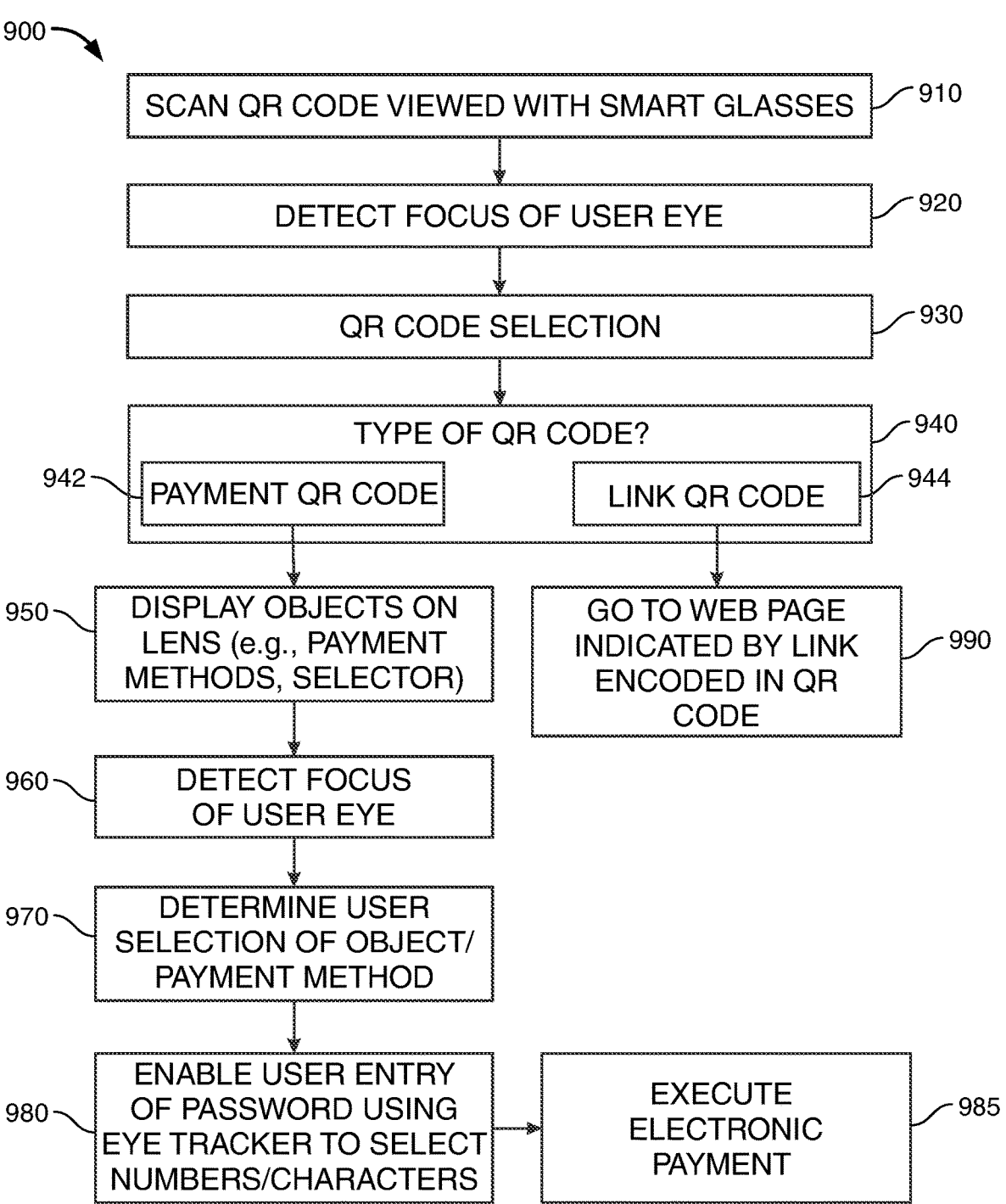
FIG. 9 shows an illustrative example of a flow chart for using eye tracking with smart glasses in accordance with principles of the disclosure.

FIG. 9 shows an illustrative flow chart 900 of steps that may be performed in accordance with the present disclosure.

At step 910, a user wearing smart glasses may view a QR code through a lens of the smart glasses. The QR code may appear on an electronic display, such as a display of a POS payment system, or elsewhere, such as on a printout. The QR code may have been generated by a QR code generator and may contain encoded information. The smart glasses may scan the QR code with the smart glasses, such as with a camera on the smart glasses, to read the QR code. The scanner may be performed by an eye tracker that detects that the user has focused on the QR code that is viewable with the lens for a predetermined duration. An application on or operatively connected to the smart glasses, such as a camera application or a QR code reader application, may be used to electronically capture the QR code that is seen through the smart glasses. An eye tracking application that is on or operatively connected to the smart glasses may be used to operate the eye tracking application to track the eye movements of the user.

At step 920, the focus of the user's eye may be detected. At step 930, if the user focus on the QR code for a predetermined duration, the QR code may be selected.

At step 940, the type of the QR code may be determined. For example, the QR code may be a QR code 942 that is encoded with payment details for paying a bill at a POS or the QR may be a QR code 944 that includes a link (hyperlink) that may point to a web page, document, or other object.

If the QR code is determined to be a payment QR code, at step 950, a payment application on smart glasses may be opened, and images of one or more objects may be shown in augmented reality on the lens of the smart glasses. The objects may include a selector object that may include an image of the scanned QR code and may include or more objects displayable on the lens in augmented reality. These other objects may reflect available payment methods which the user may use to make a payment at a POS. The payment may be a full or partial payment of the bill. These payment methods may have been preregistered for use by the user to effect electronic payments. The selector object may be moved using eye tracking of eye movements to overlap another object representing a payment method for the user to select the chosen payment method.

At step 960, an eye tracker on the smart glasses may detect that the user is focusing on one of the displayed objects for a predetermined duration. The user may view the displayed objects and focus on one of the displayed payment methods that the user will use, if any, to pay the bill. At step 970, when the user focuses on one of the displayed object for the predetermined duration, the selection object may be selected at a first position at which it is displayed on the lens.

Once the selector object is selected, additional user's eye movements may then be tracked by the eye tracker. When the user moves the user's eye, the movement may be tracked and may result in a drag operation in which the selector object is moved across the lens based on eye movement from the first position to a second position on the lens. The selector object may be released at the second position by the user focusing on the second position for a predetermined duration. This release may represent a "drop" operation. Where the second position at which the selector object is located, the release of the selector object may cause the selection of the payment method represented by the object at the second position. The selector object may be shown on the lens as overlapping the payment method object when the selector object is dragged to the second position and released. The application may be configured such that movement of the selector object to a location on the lens without any object present or to a spot on the lens designated to release the selector object may release the selector object.

In an alternative embodiment, the electronic payment application may determine the user's selection of a payment method upon scanning of the payment QR code without using a selector object, or without the need for a selector object, by detecting movements of the user's eye with the eye tracker and selecting one of the payment methods by the user's focus with the user's eye for a predetermined duration.

At step 980, with the payment method selected using eye movements, the user may be enabled to enter a password using the eye tracker to select numbers, letters, or characters that may be selected by focusing an eye on a number, letter or character on a displayed numeric keypad or keyboard for a predetermined duration.

At step 985, the electronic transaction to pay the bill or a portion thereof may be executed.

If the QR code is determined at 924 to be encoded as a navigation type of QR code to automatically direct the user to a web page using an encoded link, such as to view information, at step 990, the QR code selected at step 930 may cause the web page indicated by QR code to be displayed on lens 312.

The predetermined durations to perform an action of capturing of QR code, selection, hold, drag or drop (release) may be the same or may differ depending on the operation being performed. For example, the QR code may be selected for capture and the selection of an object may both be set to be performed after a user focus of a predetermined duration, such as 2 seconds, or each of these selection may be set to be different. The predetermined durations may be set in the QR code scanner, the eye tracking application, the electronic payment application or elsewhere and may each be set to a fixed duration or a user-selectable duration.

Figure 10:
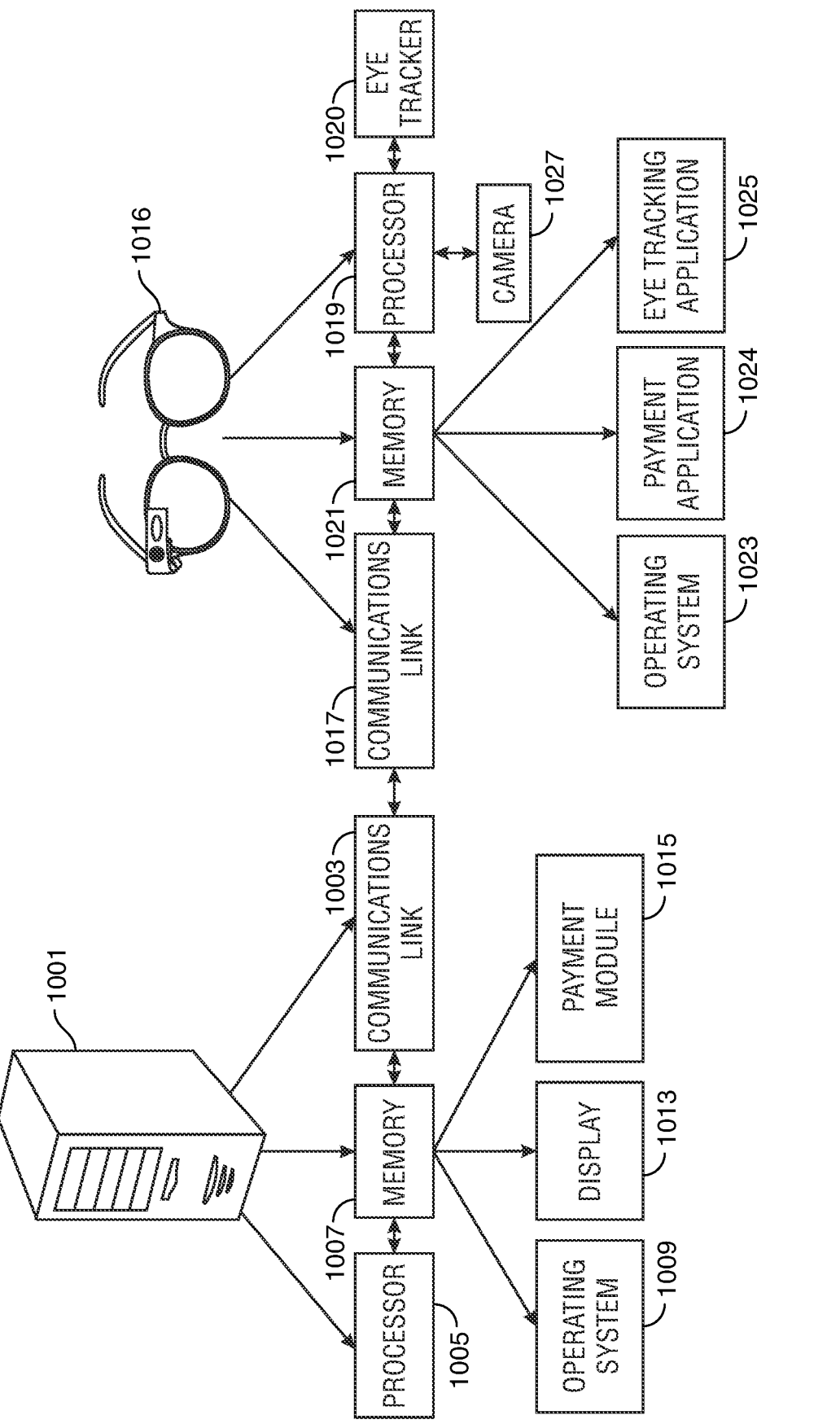
FIG. 10 shows an illustrative system in accordance with principles of the disclosure.

FIG. 10 shows an illustrative system in accordance with principles of the disclosure. The system may include a server 1001 that may be configured for paying bills, such as a payment system that may be used as a payment system, such as to store methods of payment and process the payments to the POS. Server 1001 may be operated by a financial institution. Smart glasses 1016 may communicate with server 1001 via communications link 1017 at smart glasses 1016 and server communications link 1003 at server 1001.

Server 1001 may include server communications link 1003, a server processor/processors 1005, and a server non-transitory memory 1007, an operating system 1009, a display 1013 connected to server 1001, a payment module 1015 for executing payments requested by a payment application, such as payment application 1024, as well as other components.

Smart glasses 1016 may include a non-transitory memory 1021, device communications link 1017, and a processor 1019, as well as other components.

Smart glasses 1016 may include an operating system 1023, an electronic payment application 1024, and an eye tracking application 1025. Payment application 1024 may include eye tracking application 1025. Payment application 1024 may be a mobile payment application. Payment application 1024 may be used for effecting payments to a POS and for maintaining a list of available user payment methods for selection using the smart glasses. Smart glasses 1016 may be further in communication with an eye tracker 1020, which may be built into smart glasses 1016 or may be operably connected to transmit eye tracking signals to smart glasses 1016 for use by the eye tracking application 1025. Alternatively, eye tracking application 1025 may be located elsewhere such as at eye tracker 1020 and communicate with payment application 1024. Smart glasses 1016 may further include a camera 1027 for scanning a QR code that may be viewed using the smart glasses.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, and computer program products for selecting, holding, dragging, and dropping objects leveraging eye tracking technology and augmented reality, may be provided. Persons skilled in the art will appreciate that the present invention can be practiced by other than the described embodiments, which are presented for purposes of illustration rather than of limitation.

What is claimed is:

1. Smart glasses for electronically paying a bill at a point of sale (POS) using an electronic payment system, the smart glasses comprising:

a lens configured to display thereon one or more objects to be viewed by a user of the smart glasses in augmented reality;

an eye tracker to track movements of an eye of the user; and one or more processors operable to execute a payment application that is configured to:

detect, using the eye tracker, a focus of the eye on a first object, of the one or more objects, shown on the lens at a first position, wherein the first object comprises a QR code;

determine a user selection of the first object when the focus of the eye on the first position is maintained by the user for a first predetermined duration; and in response to the determination of a user selection of the first object comprising the QR code using the eye tracker, electronically execute payment of the bill using the QR code in the first object;

wherein two or more of the one or more objects represent multiple payment methods including a payment method which the user selects, and the first object is used to select the payment method for paying the bill when the first object is moved to overlap one of the one or more objects other than the first object.

2. The smart glasses of claim 1, wherein:

the lens is further configured for the user to view an image of the QR code through the lens; and the smart glasses further comprise:

a camera configured to capture the image of the QR code that the user views and focuses on through the lens at the POS for the first predetermined duration;

the QR code is a payment QR code for payment of the bill; and the payment application is further configured to, upon the user selection of the QR code, display on the lens the two or more of the one or more objects that represent the multiple payment methods for payment of the bill.

3. The smart glasses of claim 2, wherein the payment application is further configured to cause the display of the two or more objects on the lens when the user has focused the eye on the QR code for a second predetermined duration.

4. The smart glasses of claim 3, wherein:

the payment QR code comprises payment details for the bill.

5. The smart glasses of claim 4, wherein:

the payment application is further configured to hold the first object that has been selected and monitor movement of the eye of the user using the eye tracker to enable the user to drag the first object from the first position to a second position on the lens by the movement of the eye.

6. The smart glasses of claim 5, wherein the payment application is further configured to release the first object at the second position when the user focuses on the first object at the second position for a third predetermined duration.

7. The smart glasses of claim 1, wherein:

the first object is configured as a selector object to select one of the two or more objects that represent the multiple payment methods when the first object is moved to a second position on the lens; and the payment application is further configured to cause the electronic execution of the bill payment using the selected one of the multiple payment methods when the user releases the first object at the second position.

8. The smart glasses of claim 1, wherein the payment application is further configured to release the selected first object when the user focuses on a second position on the lens at which no object is displayed or at a location designated for releasing for a fourth predetermined duration.

9. The smart glasses of claim 1, wherein the payment application is configured to cause a display on the lens, in response to selection of the payment method, a keypad or keyboard for the user to enter a password having one or more characters using the eye tracker by focusing on each of the one or more characters in the password one at a time for a fifth predetermined duration to enter the password.

10. A computer program product stored on a non-transitory computer readable medium for using smart glasses to electronically pay a bill at a point of sale (POS) wherein the computer program product comprises a payment application comprising executable instructions that, when executed by a processor on a computer system:

display, on a lens of the smart glasses, one or more objects to be viewed by a user of the smart glasses in augmented reality;

detect, using an eye tracker, a focus of the eye on a first object of the one or more objects shown on the lens at a first position, wherein the first object comprises a QR code;

determine a selection by the user of the first object when the focus of the eye on the first object is maintained at the first position by the user for a first predetermined duration;

wherein an image of the QR code has been captured from the first object using the eye tracker and is held for use by the payment application, and the QR code comprises a payment QR code for the bill;

drop the first object on top of a second object of the one or more objects that represents a payment method by the user maintaining the focus of the eye on the second object for a second predetermined duration; and in response to the determination of a user selection of the first object, electronically execute payment of the bill using the first object and the second object.

11. The computer program product of claim 10, wherein the capturing of the image of the QR code is performed before displaying the one or more additional objects, in addition to the first and second objects, on the lens; and the display of the one or more additional objects is triggered when the user has focused the eye on the QR code for a third predetermined duration.

12. The computer program product of claim 11, wherein:

the payment QR code comprises payment details for the bill; and the selection of the first object selects a payment method for paying the bill.

13. The computer program product of claim 12, wherein the one or more additional objects represent multiple payment methods including the payment method which the user selects.

14. The computer program product of claim 13, wherein: the payment application is further configured to hold the first object that has been selected and monitor movement of the eye of the user using the eye tracker to enable the user to drag the first object from the first position to a second position on the lens by the movement of the eye.

15. The computer program product of claim 14, wherein the executable instructions further place the first object at the second position when the user focuses on the first object at the second position for the second predetermined duration.

16. The computer program product of claim 15, wherein: the first object is configured as a selector object to select the second object when the first object is moved to the second position; and the payment application is further configured to cause the electronic execution of the bill payment using the payment method represented by the second object when the user releases the first object at the second position.

17. The computer program product of claim 14, wherein the executable instructions further release the selected first object when the user focuses on a second position on the lens at which no object is displayed or at a location designated for releasing for a fourth predetermined duration.

18. The computer program product of claim 12, wherein the executable instructions display on the lens, in response to selection of the payment method, a keypad or keyboard for the user to enter a password having one or more characters using the eye tracker by focusing on each of the one or more characters in the password one at a time for a fifth predetermined duration to enter the password.

* * * * *